US012607160B2

United States Patent
(12) United States Patent
McHugh et al.

(10) Patent No.: US 12,607,160 B2
(45) Date of Patent: Apr. 21, 2026

(54) LOCAL POWER GENERATION FOR GAS TO LIQUID CONVERSION AND FLARE REDUCTION SYSTEMS AND METHODS

(71) Applicant: Cameron International Corporation, Houston, TX (US)

(72) Inventors: Edmund Peter McHugh, Longford (IE); Belgin Baser-Langenau, Houston, TX (US)

(73) Assignee: Cameron International Corporation, Houston, TX (US)

( * ) Notice: Subject to any disclaimer, the term of this patent is extended or adjusted under 35 U.S.C. 154(b) by 45 days.

(21) Appl. No.: 18/748,130

(22) Filed: Jun. 20, 2024

(65) Prior Publication Data

US 2024/0426267 A1 Dec. 26, 2024

Related U.S. Application Data

(60) Provisional application No. 63/596,654, filed on Nov. 7, 2023, provisional application No. 63/509,079, filed on Jun. 20, 2023.

(51) Int. Cl.

*F03B 13/08* (2006.01)
*E21B 41/00* (2006.01)
*E21B 43/34* (2006.01)

(52) U.S. Cl.

CPC .......... *F03B 13/08* (2013.01); *E21B 41/0085* (2013.01); *E21B 43/34* (2013.01)

(58) Field of Classification Search

CPC .................................................. E21B 41/0085
See application file for complete search history.

(56) References Cited

U.S. PATENT DOCUMENTS 4,060,988 A * 12/1977 Arnold .................. E21B 43/267 165/45
4,171,017 A * 10/1979 Klass ................... B01D 63/101 166/266
4,824,447 A * 4/1989 Goldsberry ............ B01D 53/22 96/9
7,958,716 B2 * 6/2011 Ziegenfuss ............. F01D 15/10 60/39.465
11,078,767 B2 * 8/2021 Tiffany, III ............. E21B 43/18
11,174,715 B2 * 11/2021 Atisele .................... F01K 9/003
2012/0193103 A1 8/2012 Hall
2017/0306725 A1 * 10/2017 Hunter ................ E21B 41/0085

FOREIGN PATENT DOCUMENTS

WO WO-2012103591 A1 * 8/2012 ............. E21B 43/40

* cited by examiner

*Primary Examiner* — Thomas E Lazo
(74) *Attorney, Agent, or Firm* — Kyle R. Miiller

(57) ABSTRACT

A system for local power generation to power equipment at a well site which may include a gas line configured to receive a gas flow from a well. The system may also include a turbine comprising an inlet and an outlet and configured to receive the gas flow from the gas line at the inlet and generate power based on a pressure differential between the inlet and the outlet.

20 Claims, 7 Drawing Sheets

LOCAL POWER GENERATION FOR GAS TO LIQUID CONVERSION AND FLARE REDUCTION SYSTEMS AND METHODS

CROSS REFERENCE TO RELATED APPLICATIONS

The present application claims the benefit of U.S. Provisional Application No. 63/596,654, filed Nov. 7, 2023, and U.S. Provisional Application No. 63/509,079, filed Jun. 20, 2023.

BACKGROUND

Field

The present disclosure generally relates to systems and methods for generating power for local power at a well site, such as generating local power for gas to liquid conversions. More specifically, electrical or mechanical power may be generated by harnessing a pressure differential in a hydrocarbon flow, retrieved via a well, to power well site operations such as converting gaseous portions of reservoir fluid retrieved from a well into a liquid.

Description of Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

As natural resources are extracted from reservoirs via wells, the extracted hydrocarbons may be transported to various types of equipment, tanks, processing facilities, and the like via transport vehicles, a network of pipelines, etc. For example, hydrocarbons such as oil and natural gas may be extracted from the reservoirs, via hydrocarbon wells, and then may be transported, via the network of pipelines, to various processing stations that perform various phases of hydrocarbon processing to make the produced hydrocarbons available for use or further transport.

Additionally, in some scenarios, reservoir fluid may be processed, at least partially, after extraction, to separate liquid hydrocarbons, such as oil, from gaseous hydrocarbons, such as natural gas. However, infrastructure for transporting the natural gas may be limited, such as in remote well sites. As such, the natural gas may be disposed of such by burning via a flare rather than being captured due to the lack of infrastructure to transport the natural gas away from the remote well site.

Furthermore, in some scenarios, the pressure of the hydrocarbons within the pipelines, such as output from a well, may be higher than necessary or too high for effective/viable transportation and/or too high for input to one or more processing systems. As such, at one or more locations along the pipeline(s), the pressure of the hydrocarbons may be reduced, such as via a choke valve, to allow for handling and/or processing of the hydrocarbons. Unfortunately, the pressure reduction achieved by such choke valves essentially wastes the potential energy associated with the pressurized hydrocarbons, rather than harnessing the potential energy for another use.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system for generating power and powering a gas-to-liquid converter may include a separator that receives a mixed state hydrocarbon flow and outputs a gas flow and a liquid flow. The system may also include a turbine having an inlet and an outlet that receives the gas flow or the liquid flow at the inlet and generates power based on a pressure differential between the inlet and the outlet. Additionally, the system may include a gas-to-liquid converter that liquefies the gas flow utilizing the power generated via the turbine.

In one embodiment, a system for local power generation includes a first gas line configured to receive a gas flow from a well. The system further includes a turbine comprising an inlet and an outlet and configured to receive the gas flow from the first gas line at the inlet and generate power based on a pressure differential between the inlet and the outlet. Additionally, the system may further include a second gas line to receive the gas flow from the outlet of the turbine. In some embodiments, the second gas line may be connected to a gas-to-liquid converter powered by the generated power to convert at least a portion of the gas flow into a liquid hydrocarbon. In some embodiments, the second gas line is connected to gas infrastructure, such as a natural gas pipeline.

In one embodiment, a system for local power generation includes a separator configured to receive a mixed state hydrocarbon flow from a well, separate the mixed state hydrocarbon flow into a liquid flow and a gas flow, and output the liquid flow to a liquid line and to output the gas flow to a gas line. The system further includes a first turbine fluidly coupled to the separator and comprising a first inlet and a first outlet. The first turbine is configured to receive the gas flow from the gas line at the first inlet and generate power based on a pressure differential between the first inlet and the first outlet. The system further includes a gas-to-liquid converter fluidly coupled to the first turbine and configured to liquefy at least a first portion of gas flow exiting the first outlet of the first turbine utilizing the generated power.

In one embodiment, a method of local power generation includes extracting a gas flow from a well. The method further includes directing the gas flow into a turbine comprising an inlet and an outlet, the turbine configured to receive the gas flow at the inlet and generate power based on a pressure differential between the inlet and the outlet. The method further includes generating power with the turbine.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
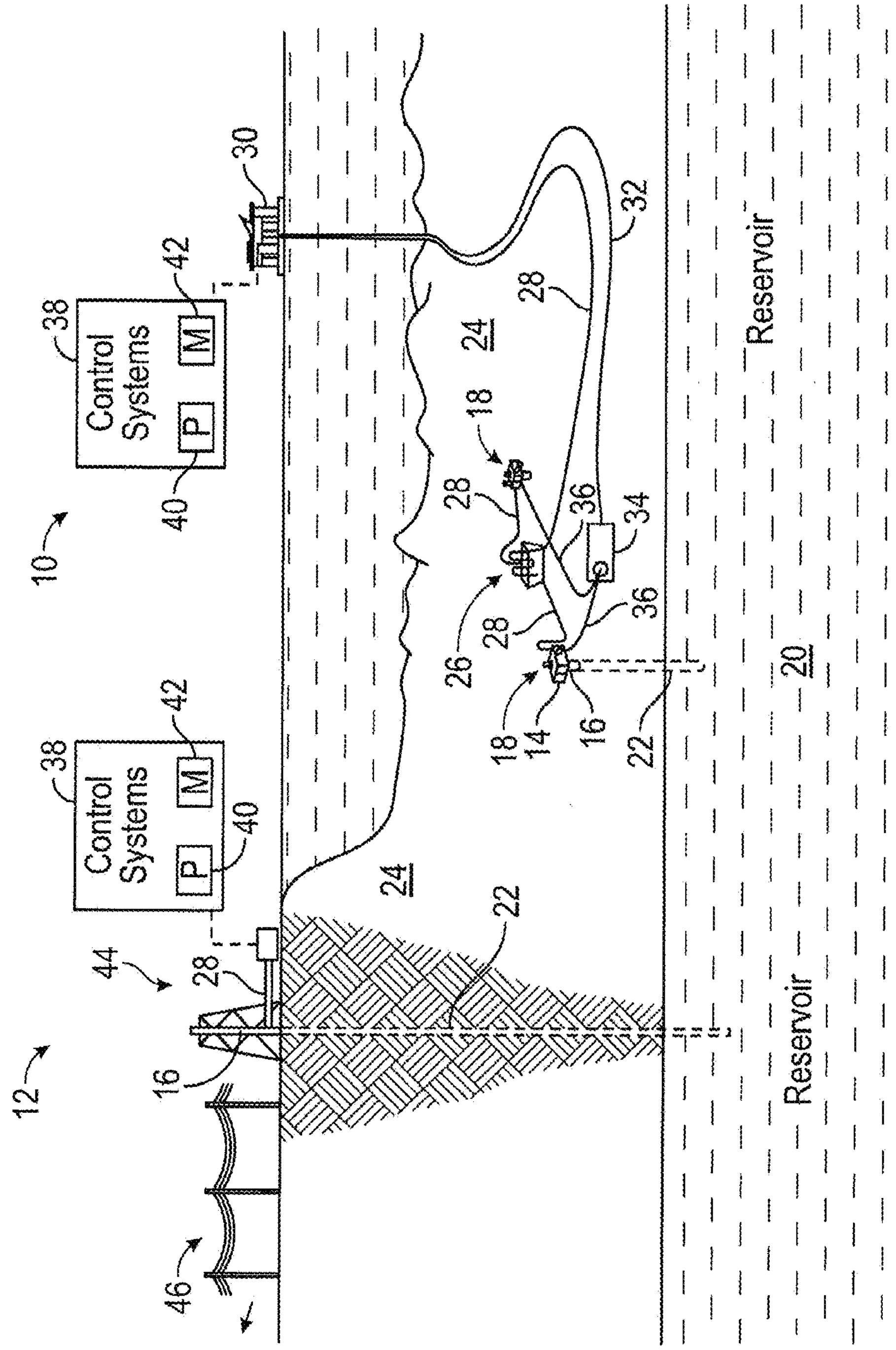
FIG. 1 is a schematic view of a land-based production system and a subsea production system, according to an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Reservoir fluids, such as oil, natural gas, other hydrocarbons, etc., may be obtained from subterranean or subsea geologic formations, often referred to as reservoirs, by drilling one or more wells that penetrate into the geologic formation. In subsea applications, various types of infrastructure may be positioned underwater and/or along a sea floor to aid in retrieving the hydrocarbon fluids. In both land-based and subsea applications, extracted reservoir fluids may be transported (e.g., via one or more pipelines) from the well(s) to various types of equipment, tanks, processing facilities, and the like.

In some scenarios, the pressure of the reservoir fluid, in liquid, gas, or mixed state, within the pipelines, such as output from a well may be higher than necessary or too high for effective transportation and/or for input to one or more processing systems. As such, at one or more locations along a flowline (e.g., pipeline) from a well, the pressure of the reservoir fluid may be reduced, such as via a choke valve, to allow for handling and/or processing of the reservoir fluid. For example, a choke valve may reduce the pressure of an oil and gas mixture to facilitate usage of more cost-effective materials (e.g., lower pressure piping) and/or reduce the pressure of the oil and gas mixture to within an operating range of an oil and gas processing system. As such, a pressure differential may be created or already exist between different portions (e.g., before and after a choke valve) of the flowline. In some instances, the potential energy of the pressurized hydrocarbons prior to the choke or other pressure reducing device may be large enough to harness for use. Thus, it may be beneficial to harness the potential energy associated with the pressure differential between the higher and lower pressure sections of the pipeline.

In some embodiments, a turbine such as a turboexpander may utilize the pressure differential to generate electrical or mechanical power. For example, a primary flow path of the reservoir fluid from a well to one or more processing systems may include a choke valve or other pressure reducing device, and a parallel flow path (e.g., parallel to the primary flow path and bypassing the choke valve) may include a turbine that converts the potential energy of the pressure differential to mechanical energy, such as by driving an output shaft. Moreover, the turbine may be coupled to or integrated with a generator to produce electrical power from the mechanical energy of the turbine. This power, such as electrical power, may be consumed by equipment at the well site, such as a gas-to-liquid converter and/or fracking equipment. For example, the electrical power may be used to power pumps, mixers, communications, and hand tools, amongst other equipment located at a well site that requires electrical power. The electrical power produced by the generator may be used to power one or more pieces of equipment while the well site is not connected to an electrical grid (e.g., power grid). In some embodiments, the electrical power produced by the generator may be used to power one or more pieces of equipment after the well site is connected to the electrical grid. In additional embodiments, the electrical power produced by the generator may supplement the power supplied by the electrical grid to one or more pieces of equipment after the well site is connected to the electrical grid.

Additionally, the reservoir fluid produced from a well may be an unprocessed (e.g., raw) liquid (e.g., oil), gas (e.g., natural gas), or liquid-gas mixture. In some scenarios, such as in an oil well, the reservoir fluid may be processed, at least in part, by a separator (e.g., debris separator and/or state separator). In some embodiments, the separator may separate, at least partially, a gas flow (e.g., natural gas) of the reservoir fluid from a liquid flow (e.g., oil) of the reservoir fluid. The gas flow, the liquid flow, or both (e.g., via separate turbines) may be utilized to generate power via a turbine. For example, the separator may provide a gas output (e.g., of natural gas) and a liquid output (e.g., oil). The gas output may flow through a gas line having a gas-driven turbine coupled to a generator, while the liquid output may flow through a liquid line having a liquid-driven turbine coupled to a generator. The gas-driven turbine and liquid-driven turbine produce power for well site equipment. The liquid output is not combusted in the liquid-driven turbine and gas output is not combusted in the gas-driven turbine. Instead, the liquid and gas exit the respective turbine's output for further processing and/or transport to market. In some scenarios, such as a gas well, a separator is optional and a gas flow from the gas well is directed to a gas-driven turbine to generate power. Similarly, the gas flow is not combusted in the gas-driven turbine and exits the turbine's output for further processing and/or transport to market.

In some scenarios, such as remote well sites, it may be difficult to transport or otherwise make use of the gas output of the separator. For example, in some scenarios, grid supplied electricity may be unavailable or at least not initially available during the construction of the well site and construction of the wellbore. Indeed, it may not be economical or feasible to transport the gas output in the gaseous state to an end user or refinery (e.g., for further processing), such as when there is an insufficient amount of natural gas produced by an oil well that would make capturing and/or transporting the gas in a gaseous form uneconomical. As such, a flare may be used to burn the gas output. However, in some scenarios, the pressure of the gas output (e.g., relative to ambient) may be utilized to motivate a turbine, as discussed herein, and the power (e.g., electrical and/or mechanical) generated by the turbine may be utilized to power a gas-to-liquid converter to change the gaseous natural gas to liquid form. Liquefying the natural gas makes the natural gas easier to handle, transport, and/or store and may make the capture of the gas that would otherwise be flared economical. For example, the turbine may produce electrical power to run a gas-to-liquid converter, such as an electrical chiller(s) or compressor(s), to transform the gas output into a liquid, such as liquefied natural gas (LNG). The liquid hydrocarbons may then be used onsite to power LNG combusting generators or transported (e.g., via trucks or pipelines) for use or further processing, such as being transported to market. Thus, capturing gas in a liquid form offsets the need to flare excess gas from the well.

By transforming the gaseous hydrocarbons into liquid form, the liquid hydrocarbons may be more viable for transportation and utilization. Moreover, by transforming the gaseous hydrocarbons into a more viable state, disposal of the gaseous hydrocarbons, such as by flaring, may be reduced or eliminated. Using an oil producing well as an example, the amount of electricity produced by the turbine generators, such as the liquid-driven generator and/or the gas-driven generator, may produce sufficient electrical power to liquefy all or part of the gas output from the wellbore which eliminates and/or reduces the need for flaring. Furthermore, harnessing the pressure of the reservoir fluid to generate the power for transforming the gaseous hydrocarbons into the liquid state may allow for such operations in remote locations where grid power is unavailable or at least not initially available during the construction of the well site and preparing the wellbore.

With the foregoing in mind, FIG. 1 is a schematic view of a subsea production system 10 and a land-based production system 12 for extracting a reservoir fluid, according to an embodiment of the present disclosure. As should be appreciated, both the subsea production system 10 and land-based production system 12 (generalized herein as production system 10, 12) are provided as example production systems, and may be implemented separately or in conjunction with one another. Moreover, the techniques disclosed herein may be applicable to either production system 10, 12.

In some embodiments, the subsea production system 10 may include a subsea tree 14 coupled to a wellhead 16 to form a subsea station 18 that extracts formation fluid, such as oil and/or natural gas, in a reservoir 20 via a well 22 drilled into a geological formation 24 (e.g., ocean floor, ground, etc.). As should be appreciated, the subsea production system 10 may include multiple subsea stations 18 that extract formation fluid from respective wells 22. In some embodiments, the formation fluid is directed from the subsea tree(s) 14 to a pipeline manifold 26 via one or more flowlines 28, and the pipeline manifold 26 may connect (e.g., via one or more flowlines 28) to a surface platform 30. In some embodiments, the surface platform 30 may include a floating production, storage, and offloading unit (FPSO) or a shore-based facility. Moreover, in some embodiments, the surface platform 30 may be an offshore production platform having one or more wells 22 extending therefrom through the water and into the geological formation 24. In addition to flowlines 28 that carry the formation fluid away from the wells 22, the subsea production system 10 may include lines or conduits 32 that supply fluids, as well as carry control and data lines to the subsea equipment. These conduits 32 may connect to a distribution module 34, which in turn couples to the subsea stations 18 via supply lines 36.

Control and monitoring of the subsea conditions and operations, as well as those on the surface platform 30 may be performed via one or more controllers or control systems 38, including one or more processors 40 and memory 42. The control system(s) 38 may be disposed at one or more subsea locations, on the surface platform, or a combination thereof. As should be appreciated, the processor(s) 40 may execute instructions stored in memory 42 to perform control and/or monitoring functions. Moreover, the memory 42 may be any suitable article of manufacture that can store the instructions. For example, the memory 42 may be read-only memory (ROM), random-access memory (RAM), flash memory, an optical storage medium, or a hard disk drive, to name a few examples. Furthermore, the processor(s) may include any suitable computing circuitry such as general-purpose microprocessors, application specific integrated circuits (ASICs), field programmable gate arrays (FPGAs), or any combination thereof.

Similarly, the land-based production system 12 may include one or more controllers or control systems 38 to monitor and/or control operations of surface equipment 44 and/or downhole equipment (not shown) to extract reservoir fluid from a reservoir 20 via one or more wells 22. As should be appreciated, the surface equipment 44 may include production trees, pipeline manifolds 26, reservoir fluid processing systems, etc., depending on implementation. Moreover, one or more flowlines 28 may generally direct the reservoir fluid from a well 22 to the other surface equipment 44.

As discussed herein, the reservoir fluid extracted from the reservoir 20 may be pressurized with respect to the environment (e.g., atmosphere, subsea, etc.) of the well 22. Moreover, while at least a portion of such pressure may be desired to be maintained (e.g., to motivate flow), the pressure may be greater than desired to continue to the other components of the production system 10, 12. To capitalize on this pressure, a turbine may be disposed (e.g., along one or more flowlines 28) between a well 22 and a lower pressure portion of the production system 10, 12 to produce electrical power and/or drive various equipment. For example, a pressure differential (and fluid flow therebetween) across the turbine may motivate rotation of a turbine rotor, and a generator coupled to the turbine may produce electrical power therefrom. The electrical power produced via the turbine may then be utilized to power one or more portions of the production system 10, 12 or be exported to an electrical grid 46, such as municipal infrastructure. However, as discussed further below, in some scenarios, an electrical grid 46 may be unavailable, and the power generated by the turbine(s) may be used onsite to power equipment, such as being used to power a gas-to-liquid converter to change the state (e.g., gas state to liquid state) of all or a portion of the reservoir fluid.

Figure 2:
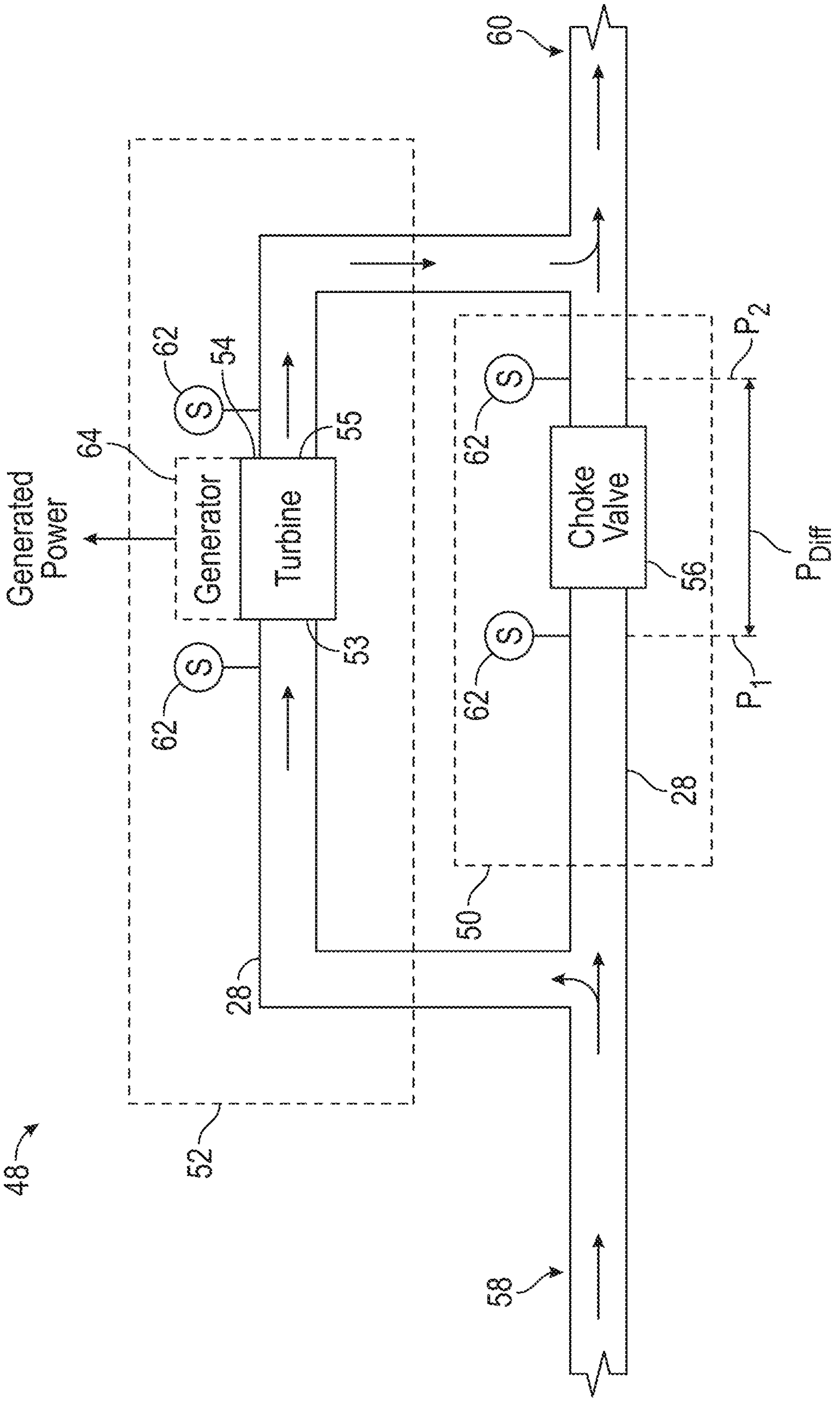
FIG. 2 is a schematic view of a portion of a flowline of FIG. 1, including a primary flow path and a parallel flow path having a turbine, according to an embodiment of the present disclosure.

FIG. 2 is a schematic view of a portion 48 of a flowline 28, including a primary flow path 50 and a parallel flow path 52 having a turbine 54, according to an embodiment of the present disclosure. As discussed herein, it may be desired to supply reservoir fluid to one or more fluid processing systems (e.g., for refinement, transportation, etc.). However, the pressure of the reservoir fluid from the well 22 may be higher than desired. As such, in some embodiments, a choke valve 56 or other pressure reducing fitment such as an in-line control valve may be disposed along the primary flow path 50 of the flowline 28. The choke valve 56 may provide an adjustable pressure drop between the inlet 58 of the portion 48 of the flowline 28 (e.g., from the well 22) and an outlet 60 of the portion of the flowline 28 (e.g., to fluid processing systems, transportation systems, etc.). For example, a control system 38 may receive feedback from one or more sensors 62 disposed at different locations on the flowline 28 based on which the pressure of the reservoir fluid exiting the primary flow path 50 may be regulated (e.g., via the choke valve 56). The sensors 62 may include pressure sensors, temperature sensors, flow meters, spectral sensors (e.g., to determine a composition of the reservoir fluid), water or moisture sensors, etc. Moreover, the turbine 54 may include one or more sensors 62 therein and/or be utilized to output sensor feedback. For example, the rotation of the turbine 54 may be proportional to the electrical power production therefrom and/or the flow rate of the reservoir fluid. As such, the turbine 54 may have a rotation sensor (e.g., rotations per minute (RPM) sensor) and/or an electrical sensor measuring power output of the turbine 54/generator 64 which may be used to determine the flow rate of the reservoir fluid. Furthermore, the choke valve 56 may be any suitable type of choke valve 56 and may be electronically or manually actuated. Moreover, as should be appreciated, although discussed herein as a choke valve 56, any suitable pressure or flow control valve may be utilized to regulate flow through the primary flow path 50 and/or the parallel flow path 52.

The pressure differential, $P_{Diff}$ (e.g., P1-P2), across the choke valve 56 in the primary flow path 50 likewise causes a pressure differential along the parallel flow path 52. The parallel flow path 52 is shown connected to an inlet 53 of the turbine 54. Reservoir fluid, such as a gas, exiting an outlet 55 of the turbine 54 is directed back into the primary flow path 50 past the choke valve 56 disposed in the primary flow path 50. As such, the turbine 54, such as a turboexpander, may be energized due to the flow through the parallel flow path 52 motivated by the pressure differential. The turbine 54 may include an outer casing, a rotor disposed inside the outer casing, one or more bearings (e.g., magnetic bearings), and a plurality of turbine blades coupled to the rotor along an internal flow path (e.g., expanding flow path) through the turbine 54 from the inlet 53 to the outlet 55. In certain embodiments, the turbine 54 may include one or more stages of the turbine blades. The reservoir fluid flowing along the parallel flow path 52 may flow against and between the turbine blades along the internal flow path to drive rotation of the rotor, thereby generating mechanical energy while expanding and reducing the pressure of the reservoir fluid. Moreover, the mechanical energy of the turbine 54 may be converted to electrical power via a generator 64 mechanically coupled to and rotated by the rotor of the turbine 54. As should be appreciated, any suitable turbine 54 may be utilized to convert the pressure differential into mechanical (and electrical, via the generator 64) energy. For example, in some embodiments, the turbine 54 may be a straight or diagonal inflow turbine with or without a shroud (e.g., for axial pressure balancing). Moreover, the turbine may be hermetically sealed from the reservoir fluid or an in-line, flow-through turbine may be used, where the reservoir fluid is able to flow through internal pathways (e.g., for bearing lubrication, cooling, etc.) of the turbine 54. Moreover, while shown as a single turbine 54, in some embodiments, multiple turbines 54 may be disposed in series and/or in parallel (e.g., multiple parallel flow paths 52 and/or multiple turbines 54 in parallel within a single parallel flow path 52) to capture the potential energy of the pressure differential. For example, the pressure differential between the inlet 58 and outlet 60 may be larger than the operating pressure differential of a single turbine 54, and the operating pressure differential of multiple turbines 54 (e.g., in parallel or series) may sum (e.g., according to a series or parallel summation) to the total pressure differential. Additionally, while shown as a turbine 54 with a separate generator coupled thereto, in some embodiments, the generator 64 may be integrated into the turbine 54. For example, a turbine rotor may include magnets or windings such that rotation of the turbine rotor generates electric power without a separate generator 64.

Figure 3:
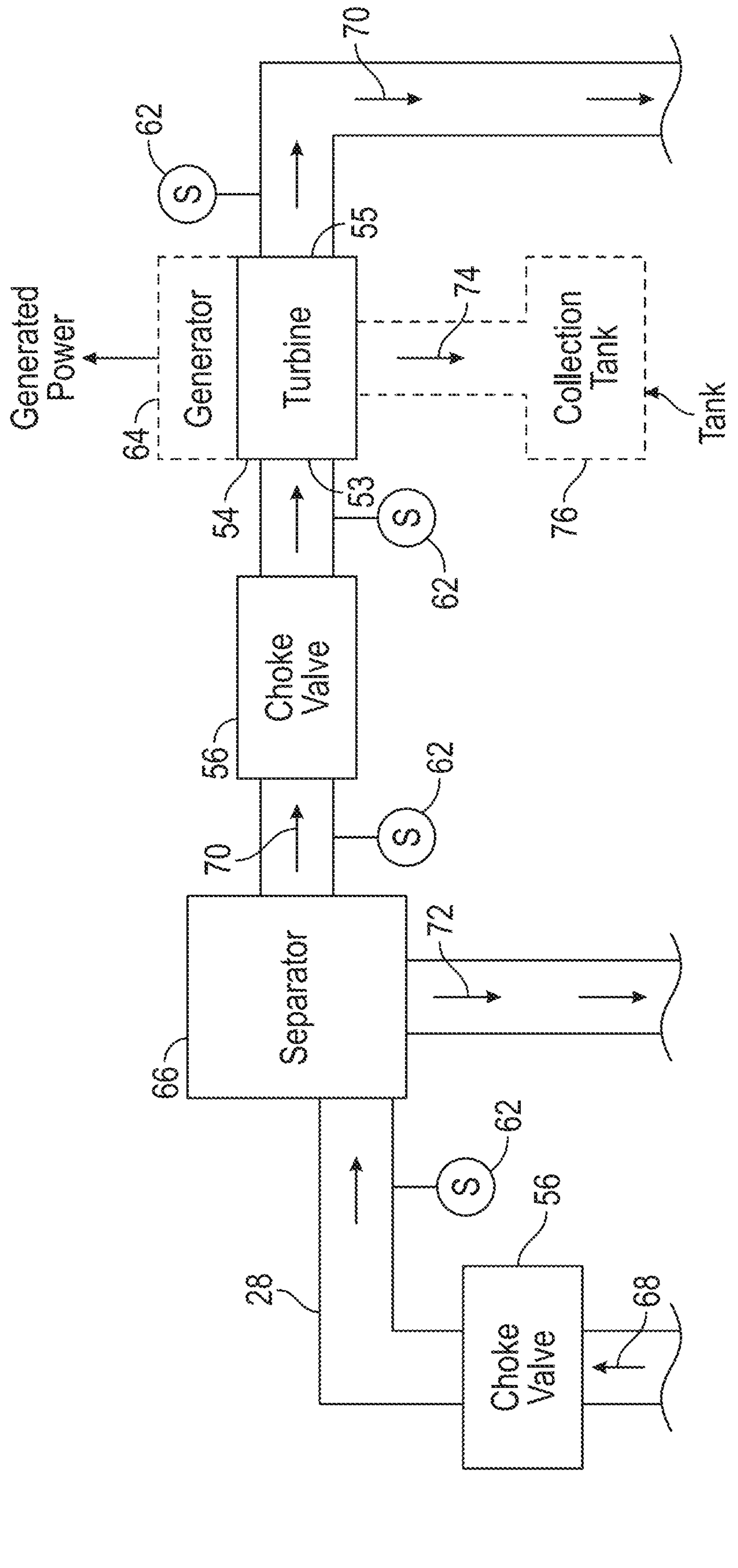
FIG. 3 is a schematic view of the portion of a flowline of FIG. 1 with a separator and a turbine, according to an embodiment of the present disclosure.

In some scenarios, the turbine 54 may have a desired operating range for the flow rate or pressure differential of the reservoir fluid passing therethrough. In some embodiments, the choke valve 56 may be used to adjust (e.g., based on feedback from the sensors 62) the pressure differential or flow rate to increase the efficiency and/or efficacy of the turbine 54. Moreover, while shown as disposed in the parallel flow path 52, in some embodiments, the turbine 54 may be in series with one or more choke valves 56 without a parallel flow path 52, as shown in FIG. 3. As should be appreciated, the portion 48 of the flowline 28 that includes a turbine 54 may be located along any suitable portion of the flowline 28 where a pressure differential is desired or affordable. For example, in some embodiments, the portion 48 of the flowline 28 including the turbine 54 may be disposed in the subsea tree 14, a production tree of the surface equipment 44, a pipeline manifold 26, and/or a surface platform 30 to name a few. Moreover, in some embodiments, the turbine 54 may be located on a skid of the surface equipment 44 or surface platform 30. Furthermore, the turbine 54 may be disposed in any suitable orientation (e.g., horizontally, vertically, or an angle therebetween) depending on implementation.

In some embodiments, one or more additional choke valves 56 may be disposed along the parallel flow path 52 to provide for additional control of the pressures and/or flow rates through the primary flow path 50 and parallel flow path 52. For example, as exampled in FIG. 3, one or more choke valves 56 prior to the turbine 54 may allow for independent adjustment of the pressure differential between the inlet 58 and outlet 60 and the operating pressure differential across the turbine 54.

Furthermore, in some embodiments, one or more separators 66 may be disposed prior to the turbine 54 (e.g., in the parallel flow path 52). The separator 66 may be of any suitable type such as a gravity separator, a cyclone/centrifugal separator, or a combination thereof. The separator 66 may be a single-phase, two-phase, or a three-phase separator, and separate natural gas, particulate matter, water, and/or oil from an input of mixed state hydrocarbons 68. For example, the separator 66 may separate a gas flow 70 (e.g., natural gas) of the reservoir fluid from a liquid flow 72 (e.g., oil) of the reservoir fluid. Additionally, in some embodiments, the separator 66 may separate particulate matter (e.g., sand, rocks, etc.) from the reservoir fluid to reduce the likelihood of wear, such as caused by erosion, on the turbine 54 (e.g., turbine blades, turbine vanes, etc.) and/or other downstream systems. In some embodiments, such as gas wells, the separator 66, and the liquid flow 72 flowing from the separator 66, may be omitted.

Additionally, while discussed herein as being treated via a separator 66, in some embodiments, the reservoir fluid may undergo a pre-treatment process and/or separation (e.g., via a separator 66). For example, pre-treatment may include but is not limited to drying, sweetening (e.g., via removal of hydrogen sulfide (H2S) and/or carbon dioxide (CO2) from the flow), and/or cleaning such as via one or more filters, one or more dehydration units, and/or one or more molecular dryers.

Furthermore, while discussed herein as applicable to a gas flow 70 separated via a separator 66, in some embodiments, the reservoir fluid may proceed from a well 22 and through a turbine 54 without pre-treatment or use of a separator 66. For example, in some scenarios such as gas wells, the reservoir fluid may be extracted, via a well 22, in the gaseous state and proceed as the gas flow 70. Moreover, as should be appreciated, while discussed herein as a gas flow 70 and/or a liquid flow 72, such designations may be representative of the majority of the respective flow. For example, the gas flow 70 may be greater than 90% gaseous, greater than 95% gaseous, greater than 99% gaseous, greater than 99.5% gaseous, and so on.

The gas flow 70 (e.g., natural gas and/or other hydrocarbons in a gaseous state) may be directed to a turbine 54, and the pressure of the gas flow 70 through the turbine 54 may motivate the turbine 54 and generate power (e.g., mechanical power via a shaft and/or electrical power via a generator 64). In some scenarios, the expansion of the gas flow 70 through the turbine 54 may cause a portion of the gas flow 70 to condense to form a condensate flow 74. The condensate flow 74 may be collected (e.g., via a collection tank 76) and transported to market or used as fuel at the well site. Removing the condensate from the gas flow 70 reduces the amount of hydrocarbon that may have otherwise been flared via the flare 78. As should be appreciated, while discussed herein as using the gas flow 70 to motivate the turbine 54, additionally or alternatively, the liquid flow 72 may proceed through a turbine 54 to generate power for well site equipment.

Figure 4:
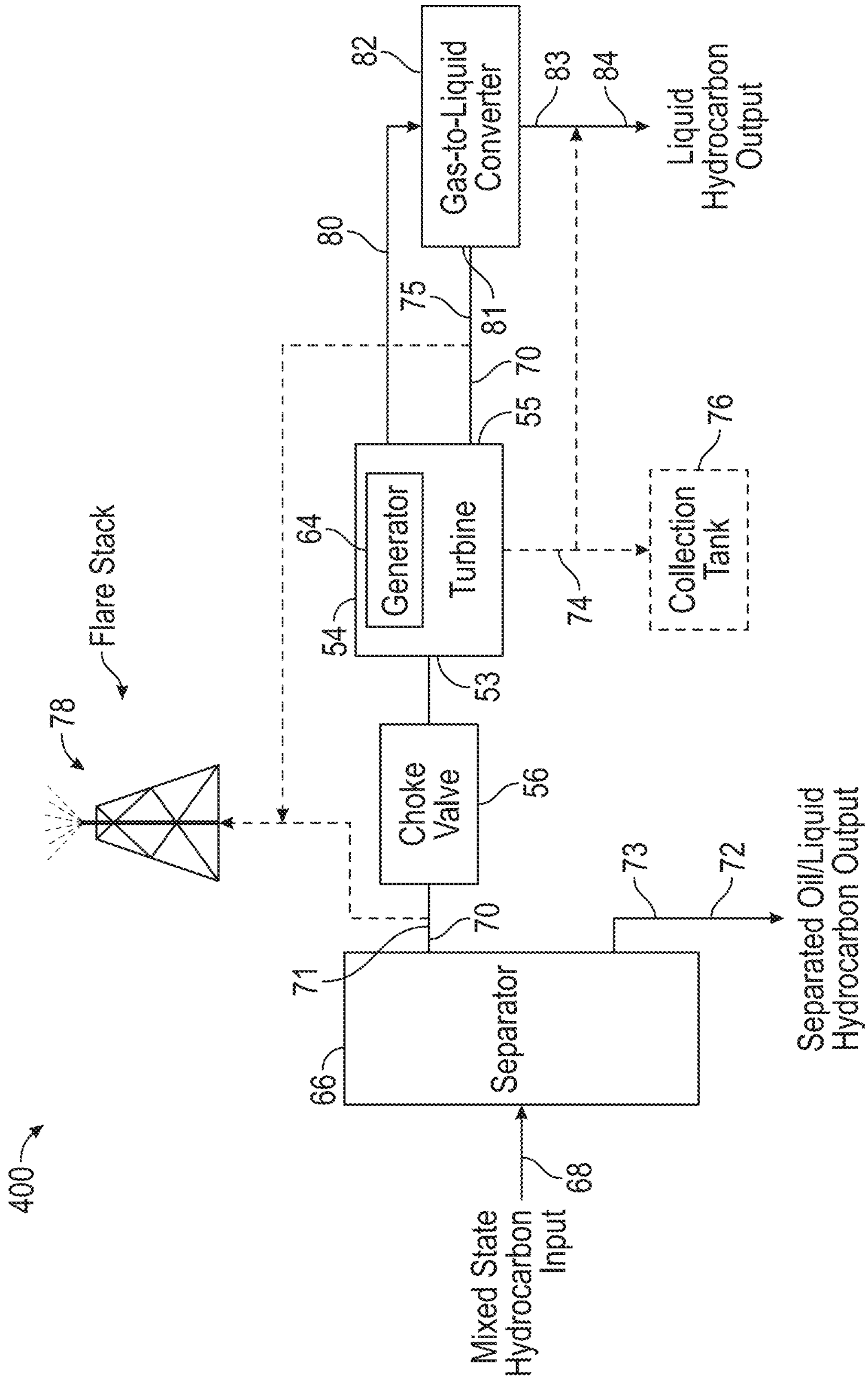
FIG. 4 is a schematic diagram of a system for utilizing a turbine to harness the potential energy of a pressure differential in a flowline and powering a gas-to-liquid converter, according to an embodiment of the present disclosure.

FIG. 4 is a schematic diagram of a system 400 for utilizing a turbine to harness the potential energy of a pressure differential in a flowline and powering a gas-to-liquid converter 82. A flow of mixed state hydrocarbons 68, such as from an oil well, may be fed into a separator 66. The gas flow 70 (e.g., natural gas) exits the separator 66 in a first gas line 71 and the liquid flow 72 (e.g., oil) exits the separator 66 in a liquid line 73. After separation (e.g., via the separator 66), in some scenarios, the gas flow 70 from the separator 66, or a portion thereof, may be disposed of, such as via a flare 78. Indeed, the gas flow 70 may be unviable in the gas state for transport or use in some scenarios, such as remote well sites. However, the gas flow 70 and/or liquid flow 72 may be routed to a turbine 54 to generate power 80 (e.g., mechanical power via a shaft and/or electrical power via a generator 64) for a gas-to-liquid converter 82, as shown in FIG. 4. For example, the first gas line 71, which may include a choke valve 56, is connected to the inlet 53 of the turbine 54 to direct the gas flow 70 through the turbine 54 or a series of turbines 54 to generate power 80. For example, the turbine(s) 54 and generator 64 may generate 1 MW of electrical power to supply the gas-to-liquid converter 82. The gas flow 70 exits the outlet 55 and is received by the gas-to-liquid converter 82 via a second gas line 75 connecting an inlet 81 of the gas-to-liquid converter 82 to the outlet 55 of the turbine 54. The power produced by turbine 54, such as electricity produced by the generator 64, is used to liquefy all or some of the gas flow 70 exiting the outlet 55. In some embodiments, part of the gas flow 70 is directed to the flare 78 after passing through the turbine 54 depending on the capacity of the gas-to-liquid converter 82 and the availability of electrical power 80. In some embodiments, the gas-to-liquid converter 82 is also powered by one or more turbines 54 and generators 64 connected to the liquid line 73. Liquefied gas exits the outlet 83 of the gas-to-liquid converter 82, which is directed to a liquefied gas line 84. This liquefied gas line 84 may be connected to a storage tank, such as an LNG tank. By transforming the gas flow 70 to a liquid state, such as LNG, the viability of capturing and transporting the gas flow 70 may be increased. Additionally, by capturing the gas flow 70, flaring may be reduced or eliminated. The gas-to-liquid converter 82 may utilize any suitable technique for liquefying the gas flow 70. For example, the gas-to-liquid converter 82 may include one or more chillers, compressors, or other liquefaction techniques. The liquefied gas flow 70 may then be stored in tanks and/or transported (e.g., to a processing center). Thus, at least portion of the gas flow 70 passing through the turbine is not being combusted, such as by the flare 78, and is instead being captured. Additionally, in some scenarios, excess gas flow 70, beyond what is liquefied, may be sent to a flare 78 from before and/or after the turbine 54, such as to maintain a desired pressure within the flowline 28 and/or maintain a throughput from the well 22. Additionally, the power 80 generated may be used to power equipment in addition to the gas to liquid converter 82. For example, the power 80 may be used to power equipment at the well site until the electrical grid 46 can be connected, where the power 80 generated thereafter can be used to supplement the power supplied by the electrical grid 46.

A first portion of the gas flow 70 may be captured as a condensate in collection tank 76, a second portion of the gas flow 70 may be liquefied by the gas-to-liquid converter 82. In some embodiments, a third portion of the gas flow may be flared via the flare 78. This third portion of the gas flow 70 that is flared may be partially flared before the gas flow 70 passes through the turbine 54 and also partially flared after the gas flow 70 passes through the turbine 54 instead of being directed into the gas-to-liquid converter 82. Thus, the amount of gas flow 70 that would otherwise need to be flared or vented is offset due to capturing a portion of the gas flow 70 as liquid hydrocarbon and/or a condensate, which reduces emissions.

In some embodiments of system 400, the flare 78 may be omitted. For example, the turbine 54 may be able to handle all the gas flow 70 from the first gas line 71 and the gas-to-liquid converter 82 may be able to liquefy all or substantially all of the gas flow 70 exiting from the turbine 54, which eliminates the need to flare gas.

Figure 5:
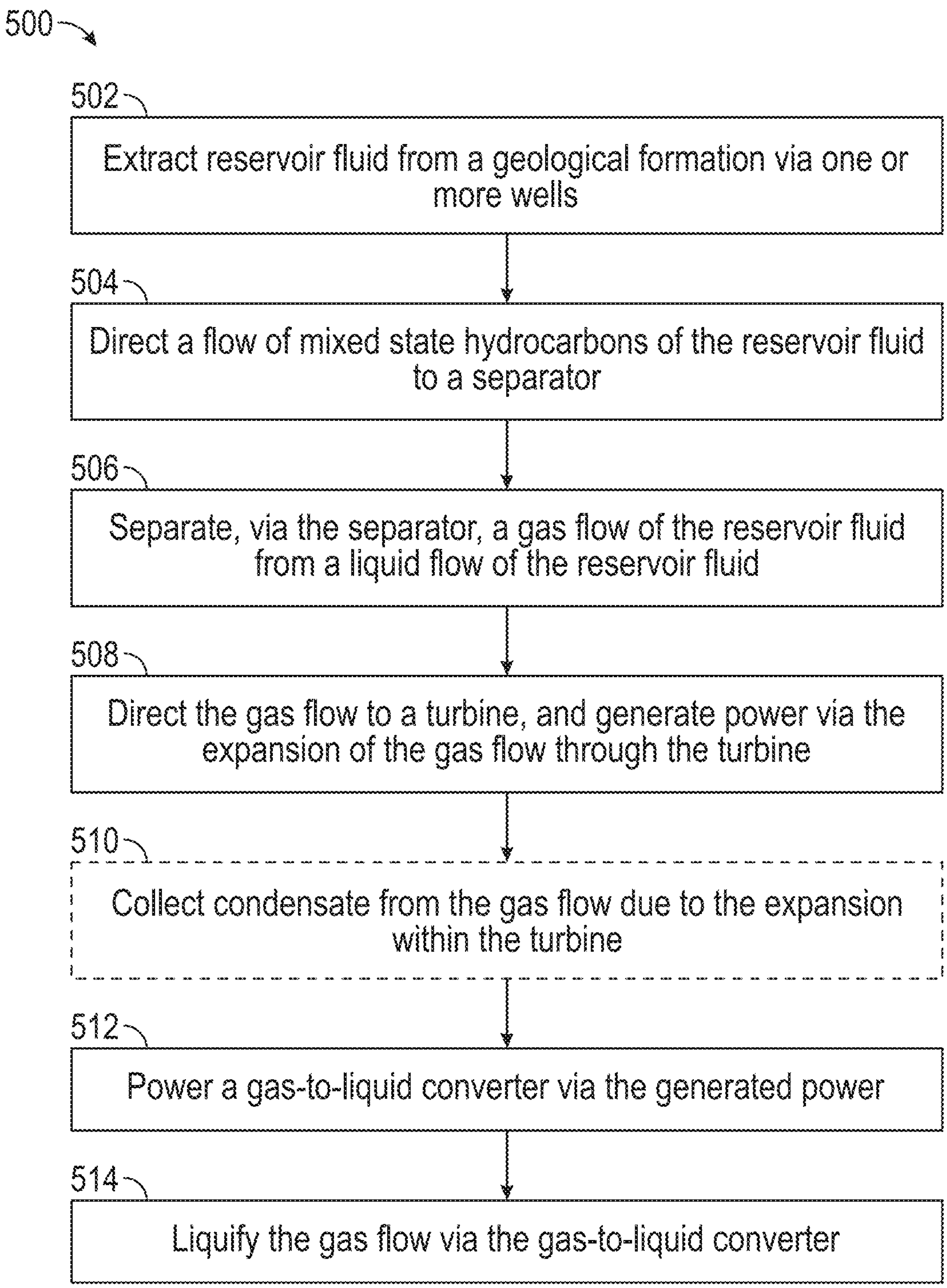
FIG. 5 is a flowchart of an example process for utilizing a turbine to harness the potential energy of a pressure differential in a flowline and powering a gas-to-liquid converter, according to an embodiment of the present disclosure.

FIG. 5 is a flowchart of an example process 500 for utilizing a turbine 54 to harness the potential energy of the pressure differential in a flowline 28 and liquefy a gas flow 70 of the reservoir fluid. For example, reservoir fluid may be extracted from a geological formation 24 via one or more wells 22, as at 502. Additionally, a flow of mixed state hydrocarbons 68 may be directed to a separator 66, as at 504. Additionally, in some embodiments, one or more separators 66 may separate a gas flow 70 of the reservoir fluid from a liquid flow 72 of the reservoir fluid, as at 506. As should be appreciated, the separator 66 may also separate particulate matter from the reservoir fluid. The gas flow 70 may be directed to a turbine 54, and power 80 may be generated via the expansion of the gas flow 70 through the turbine 54, as at 508. As should be appreciated, the liquid flow 72 may also be utilized to generate power 80 (e.g., via a separate turbine 54), and one or more regulating valves (e.g., choke valve 56) may facilitate a pressure differential across the turbine 54. Additionally, condensate due to the expansion of the gas flow 70 within the turbine 54 may optionally be collected (e.g., into a collection tank 76) from the turbine 54, as at 510. Moreover, the generated power 80 may be used to power a gas-to-liquid converter 82, as at 512. The power 80 supplied to the gas-to-liquid converter liquefies at least a portion of the gas flow 70 exiting the outlet 55 of the turbine 54, as at 514. As such, the gas flow 70 that may otherwise be discarded (e.g., via a flare 78) may be collected and prepared for transport without the need for outside power (e.g., from an electrical grid 46).

Figure 6:
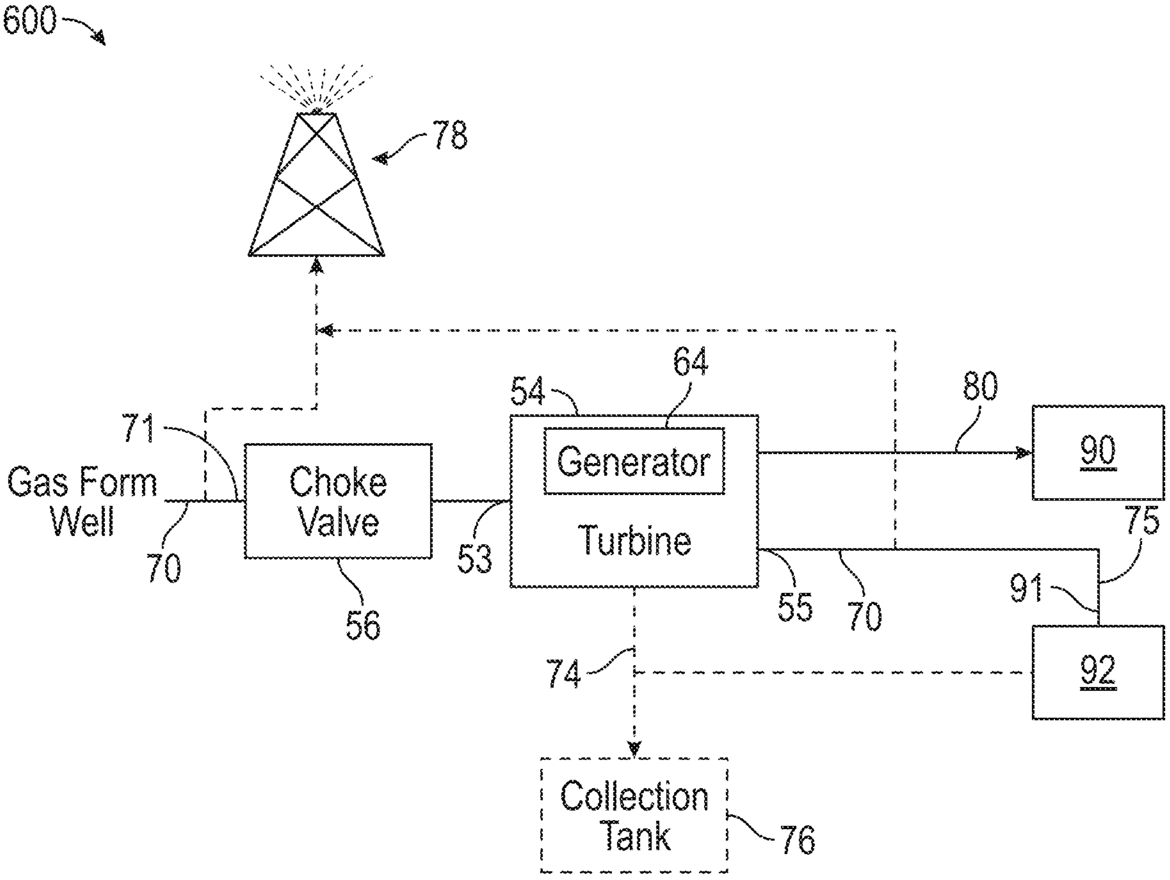
FIG. 6 is a schematic diagram of a system for utilizing a turbine to harness the potential energy of a pressure differential in a flowline and powering equipment at a well site, according to an embodiment of the present disclosure.

FIG. 6 is a schematic diagram of a system 600 for utilizing a turbine to harness the potential energy of a pressure differential in a flowline and powering equipment 90 at a well site. A gas flow 70 (e.g., natural gas), such as from a gas well, may be fed into a first gas line 71 that is connected to an inlet 53 of a turbine 54. In some embodiments, the gas flow 70 may optionally be passed through a separator 66 prior to being directed to the turbine 54 to generate power 80 (e.g., mechanical power via a shaft and/or electrical power via a generator 64) for equipment 90 at the well site. The equipment 90 may be pumps, mixers, communications, or hand tools, amongst other equipment located at a well site that requires power, such as electrical power. For example, the first gas line 71, which may include a choke valve 56, is connected to the inlet 53 to direct the gas flow 70 through the turbine 54 or a series of turbines 54 to generate power 80. For example, the turbine(s) 54 may generate 1 MW of electrical power to supply the equipment 90. The gas flow 70 exits the outlet 55 and is received by gas infrastructure 92 via a second gas line 75 connecting an inlet 91 of gas infrastructure 92 to the outlet 55 of the turbine 54. The gas infrastructure 92 may be a natural gas pipeline connected to a natural gas processing plant or other major pipeline network. Additionally, in some scenarios, excess gas flow 70, beyond what is transferred to the gas infrastructure 92, may be sent to a flare 78 from before and/or after the turbine 54, such as to maintain a desired pressure within the flowline 28 and/or maintain a throughput from the well 22. Thus, at least portion of the gas flow 70 passing through the turbine 54 is not being combusted, such as by the flare 78, and is instead being captured and sent to gas infrastructure 92. Thus, a first portion of the gas flow 70 may be captured as a condensate in collection tank 76, a second portion of the gas flow 70 may be transferred to gas infrastructure 92. In some embodiments, condensate from the collection tank 76 may be directed into a line of the gas infrastructure 92 for transport. In some embodiments, a third portion of the gas flow 70 may be flared via the flare 78. Thus, the amount of gas flow 70 that would otherwise need to be flared or vented is offset, due to directing a portion of the gas flow 70 to gas infrastructure 92 and/or capturing a portion of the gas flow 70 as a condensate, which reduces emissions.

In some embodiments, the system 600 may be connected to an electrical grid 46 and the power 80 generated by the turbine 54 supplements the electrical power supplied by the electrical grid 46. In some embodiments, the system 600 may not initially be connected to the electrical grid 46 during the initial stages of well construction. Thus, the gas flow 70 through the turbine 54 may produce some or all of the power needed to power the equipment 90 until the electrical grid 46 is connected.

In some embodiments, the system 600 may not be initially connected to the gas infrastructure 92, such as when the well site is in initial stages of construction. In some scenarios, the system 600 may initially include a gas-to-liquid converter 82 connected to the outlet 55 of the turbine 54 that is powered by turbine 54, such as in system 500 shown in FIG. 5, to liquefy part of the gas flow 70 until the gas infrastructure 92 can be connected to the well site, such as connecting the outlet 55 of the turbine 54 with the inlet 91 of the gas infrastructure 92. This liquefied gas may be stored in one or more tanks, transported, or may be used for powering combustion generators at the well site. Thus, a first portion of the gas flow 70 from the gas well may be converted to a condensate, a second portion of the gas flow 70 may be converted to a liquid hydrocarbon until the gas infrastructure 92 is connected to the outlet 55 of the turbine 54, and a third portion may be flared via the flare 78.

In some embodiments of system 600, the flare 78 may be omitted. For example, the turbine 54 may be able to handle all the gas flow 70 from the first gas line 71, which eliminates the need for flaring. All or substantially all of the gas flow 70 exiting from outlet 55 the turbine 54 may be directed to the gas infrastructure 92, which also eliminates the need to flare gas.

Figure 7:
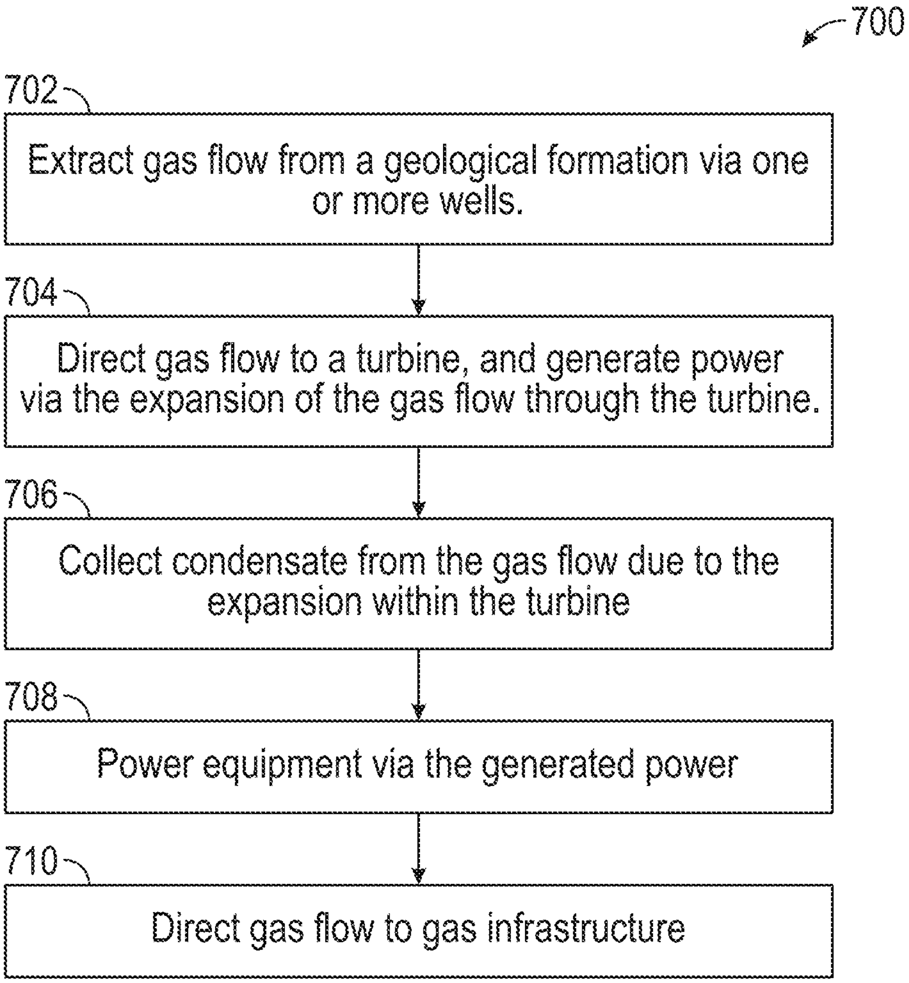
FIG. 7 is a flowchart of an example process for utilizing a turbine to harness the potential energy of the pressure differential in a flowline to generate power for equipment at a well site, according to an embodiment of the present disclosure.

FIG. 7 is a flowchart of an example process 700 for utilizing a turbine 54 to harness the potential energy of the pressure differential in a flowline 28 to generate power 80 for equipment at a well site. For example, a gas flow 70 may be extracted from a geological formation 24 via one or more wells 22, such as gas wells, as at 702. The gas flow 70 may be directed to a turbine 54, and power 80 may be generated via the expansion of the gas flow 70 through the turbine 54, as at 704. As should be appreciated, one or more regulating valves (e.g., choke valve 56) may facilitate a pressure differential across the turbine 54. In some embodiments, the gas flow 70 may pass through a separator 66 prior to being directed into the turbine 54. Additionally, condensate due to the expansion of the gas flow 70 within the turbine 54 may optionally be collected (e.g., into a collection tank 76) from the turbine 54, as at 706. Moreover, the generated power 80 may be used to power the equipment 90 at the well site, as at 708. In some embodiments, the equipment 90 is a gas-to-liquid converter 82 that liquefies at least a portion of the gas flow 70 exiting the outlet 55 of the turbine 54, such as when an electrical grid 46 and/or gas infrastructure 92 are not yet connected to the well site. When gas infrastructure 92 is connected to the well site, the gas-to-liquid converter 82 may be removed and the gas flow 70 exiting the outlet 55 of the turbine 54 flows instead into the inlet 91 of the gas infrastructure 92 through the second gas line 75. The gas infrastructure 92 can thereby be used to transport the gas away from the well site.

The technical effects of the systems and methods described in the embodiments of FIGS. 1-7 include utilizing a turbine to harness the potential energy of the pressure differential in a flowline. Moreover, techniques to power gas-to-liquid conversion of a gas flow portion of the reservoir fluid may allow that portion, which would otherwise be disposed of (e.g., via flaring), to be viable for transport and/or use. Furthermore, although the above referenced flowchart is shown in a given order, in certain embodiments, process blocks may be reordered, altered, deleted, and/or occur simultaneously. Additionally, the referenced flowchart is given as an illustrative tool and further decision and process blocks may also be added depending on implementation.

In one embodiment, a system comprises a separator configured to receive a mixed state hydrocarbon flow and output a gas flow and a liquid flow. The system further comprises a turbine comprising an inlet and an outlet and configured to receive the gas flow or the liquid flow at the inlet and generate power based on a pressure differential between the inlet and the outlet. The system further comprises a gas-to-liquid converter configured to liquefy the gas flow utilizing the power generated via the turbine.

In some embodiments, the system includes a collection tank configured to receive a condensate flow, wherein the condensate flow comprises condensated hydrocarbons (e.g., condensate) from an expansion of the gas flow through the turbine.

In some embodiments of the system, the gas flow comprises natural gas, and wherein an output of the gas-to-liquid converter comprises liquefied natural gas (LNG).

In one embodiment, a method includes separating, via a separator, a liquid flow and a gas flow from a reservoir fluid flow. The method further includes generating, via a turbine, power based on an expansion of the gas flow through the turbine. The method further includes powering, via the power generated via the turbine, a gas-to-liquid converter. The method further includes transforming, via the gas-to-liquid converter, the gas flow from a gaseous state to a liquid state.

In one embodiment, a system for generating power and powering a gas-to-liquid converter may include a separator that receives a mixed state hydrocarbon flow and outputs a gas flow and a liquid flow. The system may also include a turbine having an inlet and an outlet and that receives the gas flow or the liquid flow at the inlet and generates power based on a pressure differential between the inlet and the outlet. Additionally, the system may include a gas-to-liquid converter that liquefies the gas flow utilizing the power generated via the turbine.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for local power generation, comprising:
- a gas line configured to receive a gas flow;
- a turbine comprising an inlet and an outlet and configured to receive the gas flow from the gas line at the inlet and generate power based on a pressure differential between the inlet and the outlet; and
- a gas-to-liquid converter fluidly coupled to the outlet of the turbine and configured to liquefy at least a portion of gas exiting the outlet of the turbine, the gas-to-liquid converter being driven by the power generated by the turbine.

2. The system of claim 1, further comprising:
- a natural gas pipeline coupled to the outlet to receive the gas flow from the outlet.

3. The system of claim 1, wherein the gas-to-liquid converter is configured to liquefy a first portion of gas exiting the turbine, and further comprising:
- a flare fluidly coupled to the gas line and configured to combust a second portion of gas exiting the turbine.

4. The system of claim 3, further comprising:
- a collection tank fluidly coupled to the turbine, the collection tank configured to receive a third portion of gas exiting the turbine, wherein the third portion of gas comprises condensate from an expansion of the gas flow through the turbine.

5. The system of claim 1, further comprising:
- a separator configured to:
  - receive a mixed state hydrocarbon flow from a well;
  - separate the mixed state hydrocarbon flow into a liquid flow and the gas flow; and
  - output the gas flow from the separator to the gas line.

6. The system of claim 1, further comprising:

a collection tank configured to receive a condensate flow, wherein the condensate flow comprises condensate from an expansion of the gas flow through the turbine.

7. The system of claim 1, wherein a portion of the generated power is consumed by one or more pieces of equipment at a well site.

8. The system of claim 7, wherein the well site is unconnected to an electrical grid.

9. The system of claim 1, further comprising:

one or more sensors configured to monitor a pressure of the gas flow passing through the turbine, wherein a choke is configured to adjust a flow rate of the gas flow based on the one or more sensors.

10. The system of claim 1, further comprising:

a separator configured to receive a mixed state hydrocarbon flow from a well, separate the mixed state hydrocarbon flow into a liquid flow and the gas flow, and output the gas flow from the separator to the gas line;

a choke valve fluidly coupled between the separator and the turbine, the choke valve configured to adjust a flow rate of the gas flow;

one or more sensors configured to monitor a pressure of the gas flow passing through the turbine;

a flare fluidly configured to combust a portion of gas exiting the turbine; and a collection tank fluidly coupled to the turbine, the collection tank configured to receive a portion of gas exiting the turbine comprising condensate from an expansion of the gas flow through the turbine.

11. A system for local power generation, comprising:

a separator configured to receive a mixed state hydrocarbon flow from a well, separate the mixed state hydrocarbon flow into a liquid flow and a gas flow, and output the liquid flow to a liquid line and output the gas flow to a gas line;

a turbine fluidly coupled to the separator and comprising an inlet and an outlet, the turbine configured to receive the gas flow from the gas line at the inlet and generate power based on a pressure differential between the inlet and the outlet; and a gas-to-liquid converter fluidly coupled to the turbine and configured to liquefy at least a first portion of gas exiting the turbine, the gas-to-liquid converter being driven by the power generated by the turbine.

12. The system of claim 11, further comprising:

a flare fluidly coupled to the gas line and configured to combust a second portion of gas exiting the turbine.

13. The system of claim 12, further comprising:

a collection tank fluidly coupled to the turbine, the collection tank configured to receive a third portion of gas exiting the turbine, wherein the third portion of gas exiting the turbine comprises condensate from an expansion of the gas flow through the turbine.

14. The system of claim 11, wherein the generated power is further consumed by one or more pieces of equipment at a well site where the well is located.

15. The system of claim 14, wherein the well site is unconnected to an electrical grid.

16. The system of claim 11, wherein the turbine is a first turbine, the inlet is a first inlet, and the outlet is a first outlet, the system further comprising:

a second turbine fluidly coupled to the separator, the second turbine comprising a second inlet and a second outlet and configured to receive the liquid flow from the liquid line at the second inlet and generate power to drive the gas-to-liquid converter based on a pressure differential between the second inlet and the second outlet.

17. The system of claim 11, further comprising:

a choke valve fluidly coupled between the separator and the turbine, the choke valve configured to adjust a flow rate of the gas flow, a flare fluidly configured to combust a portion of gas exiting the turbine; and a collection tank fluidly coupled to the turbine and configured to receive condensate from an expansion of the gas flow through the turbine.

18. A method of local power generation, comprising:

extracting a gas flow from a well;

directing the gas flow into a turbine comprising an inlet and an outlet, the turbine configured to receive the gas flow at the inlet;

generating power with the turbine based on a pressure differential between the inlet and the outlet, the power generated by the turbine driving a gas-to-liquid converter; and liquefying, via the gas-to-liquid converter, at least a portion of gas exiting the outlet of the turbine.

19. The method of claim 18, further comprising:

discharging the gas flow from the outlet into a gas pipeline connected to the outlet.

20. The method of claim 18, further comprising:

condensing a portion of the gas flow in the turbine and collecting the condensate in a collecting tank.

* * * * *